US006556878B1

(12) United States Patent
Fielding

(10) Patent No.: US 6,556,878 B1
(45) Date of Patent: Apr. 29, 2003

(54) METHOD AND USER INTERFACE FOR REPRESENTING ARCHITECTURAL PLAN DIAGRAMS

(75) Inventor: Randall Jon Fielding, 4937 Morgan Ave. South, Minneapolis, MN (US) 55409-2251

(73) Assignee: Randall Jon Fielding, Minneapolis, MN (US)

( * ) Notice: Subject to any disclaimer, the term of this patent is extended or adjusted under 35 U.S.C. 154(b) by 0 days.

(21) Appl. No.: 09/542,272

(22) Filed: Apr. 4, 2000

Related U.S. Application Data

(60) Provisional application No. 60/128,109, filed on Apr. 7, 1999.

(51) Int. Cl.[7] ............................ G05B 15/02; G09G 5/14
(52) U.S. Cl. .......................... 700/83; 700/17; 345/733; 345/765; 345/781
(58) Field of Search .............................. 700/17, 20, 83, 700/97; 707/501.1, 513, 517, 520; 345/700, 733, 760, 764, 765, 781, 854

(56) References Cited

U.S. PATENT DOCUMENTS 6,388,688 B1 * 5/2002 Schileru-Key .............. 345/854
6,456,296 B1 * 9/2002 Cataudella et al. ......... 345/619

OTHER PUBLICATIONS

"e–Architect", http://www.e–architect.com, last updated Sep. 19, 2000, 122 pgs.
"e–Architect", http://www.e–architect.com/pia/cae/cae.asp, 82 pgs. (No Date).
"Architectural Record", http://www.archrecord.com, last updated Sep. 19, 2000, 123 pgs.
"American School & University Magazine", http://www.schooldesigns.com, 84 pgs. (No Date).
"North Carolina School Design Clearinghouse", http://www.schoolclearinghouse.org, 50 pgs. (No Date).
"Smart Schools Clearinghouse", http://sun6.dms.state.fl.us/smartschools/index.html, 25 pgs. (No Date).
"Autodesk", http://www3.autodesk.com, 35 pgs. (No Date).

* cited by examiner

Primary Examiner—Paul P. Gordon
(74) Attorney, Agent, or Firm—Merchant & Gould PC

(57) ABSTRACT

A method, user interface, computer storage medium and propagated signal for representing an architectural plan diagram on a graphical user interface connected to an interactive communications network is provided. The method includes the steps of displaying an architectural plan diagram on a graphical user interface, wherein the architectural plan diagram has multiple color-filled objects defined by voids, wherein the objects and voids represent features of an architectural plan; and displaying an architectural plan diagram key having a plurality of colored icons, each icon having associated feature information describing a functional feature, wherein the color of the colored icons corresponds to the color of the colored-filled objects such that each of the color-filled objects is associated with the feature information.

15 Claims, 10 Drawing Sheets

| Plan Abstract Key with Color Equivalents | | | |
|---|---|---|---|
| Area Name | AutoCAD Color | RGB values | Hexadecimal |
| Administration, Office | 143 | 83, 145, 166 | {53,91,A6} |
| Art Room | 181 | 159, 128, 255 | {9F,80,FF} |
| Class Room | 150 | 0, 127, 255 | {00,7F,FF} |
| Dining / Commons | 30 | 255, 127, 0 | {FF,7F,00} |
| Corridor, Elevator, Stair | 10 | 255, 0, 0 | {FF,00,00} |
| Elevator, Stair, Ramp | 10 | 255, 0, 0 | {FF,00,00} |
| Entry | 10 | 255, 0, 0 | {FF,00,00} |
| Library / Media Center | 172 | 0, 0, 255 | {00,00,A6} |
| Music/Theater/Auditorium | 200 | 191, 0, 255 | {FF,00,00} |
| Physical Education | 52 | 165, 165, 0 | {A5,A5,00} |
| Science | 212 | 166, 0, 166 | {7C,00,A5} |
| Teacher Resource | 22 | 166, 41, 0 | {A6,29,00} |
| Team Resource | 40 | 255, 191, 0 | {FF,BF,00} |
| Technology / Shop | 74 | 64, 128, 0 | {40,80,00} |
| Support / Utility | 41 | 255, 223, 127 | {FF,DF,7F} |

Fig. 3

METHOD AND USER INTERFACE FOR REPRESENTING ARCHITECTURAL PLAN DIAGRAMS

This application claims the benefit of priority of Provisional Application Ser. No. 60/128,109, entitled "Architectural Diagram Language, Web Browser Interface, and Facility Planning Template," filed Apr. 7, 1999.

TECHNICAL FIELD

This invention relates in general to displaying information in a compute system; more particularly, to a method and interface for displaying architectural diagrams on a computer screen.

BACKGROUND

For many years, architects, facility planners and builders have created diagrams representing a simplified, abstract version of a detailed, accurately scaled architectural floor plan. Most typically, such diagrams are used during the design process, to enable designers to examine multiple options rapidly, and to seek feedback from facility end users prior to committing to detailed floor plans. Another use for building diagrams is in public signage, such as a location map at a shopping complex or hospital; an arrow with the words "you are here" often appears in the location map. In both case the use of a diagram in lieu of a detailed plan allows a broad spectrum of the population to understand the basic organization of a facility design quickly.

The development of methodology for creating and displaying plan diagrams has not kept pace with the development of methods for the drafting of detailed architectural floor plans. The majority of new commercial and public buildings are now developed with the use of computer-aided design (CAD) for the construction documents. A nearly universal standard of file formats has been established for CAD drawings, such that users of different CAD software programs can often exchange files with minimal difficulty. In contrast, most architectural designers still rely on hand drawing on paper during the creative process. While CAD vendors have made modules available specifically for the design phase that are suitable for diagramming, neither a broad acceptance of a method or any common language of diagramming exists.

Along with the near-universal acceptance of the CAD format for developing detail plans is the archiving of details plans in a CAD format. Whereas floor plans were archived in large flat drawers, tubes and on microfilm in the past, most floor plans are now stored as electronic CAD files (printed versions may be stored in drawers or tubes as well). Electronic CAD files are easier to store and access than printed versions, however, they are typically more difficult to read on a computer monitor than on a full-size printed version. The standard resolution of a computer monitor is 72 dots per inch. At this resolution, thin lines tend to break up visually. Additionally, most computer monitors are less than half the size of a standard construction document sheet. Comprehension of a detailed floor plan on a computer screen typically requires a good deal of scrolling back and forth on the screen, because if the plan is viewed at a size to fit entirely on the screen, details are too small to comprehend. Furthermore, the lack of sharpness of lines can lead to eyestrain.

The level of sharpness of lines displayed on a computer monitor is important because architectural floor plans are primarily comprised of lines, often in varying thicknesses. The traditional drawing system relies on a large number of lines and text labels to describe an architectural floor plan. For example, the simplest classroom will typically be represented with two parallel lines on each of four sides (total of eight lines), a door and arc swing (two or more additional lines) and a label in the center of the area "Class Room." At least eleven distinct elements are required to display the classroom. Multiply this by hundreds of rooms and or features in a typical new facility, and the number of elements to display in a single architectural floor plan can easily range into the thousands—not an efficient or comfortable amount of information to view on a computer screen.

The design and construction process has become more complex in the last several decades. During this period, the field of specialized facility planning has developed. Although facility planners are often architects, and often work within architectural firms, their work product is distinct from that of the traditional architect. For example, a health care planner or educational facility planner is often involved a year or more before an architectural contract is given out, for the purpose of examining and making recommendations regarding the various factors and approaches to the facility plan. Planners typically use a wide range of tools and methods, including word processing programs, spread sheet programs, and presentation programs. Planners may or may not utilize a CAD program, but unlike the traditional architect, their key work product involves communication, reports and documents that are processed and understood by a wide variety of non-architectural or engineering professionals. Planners must typically interact with end-users, financial, public relations and legal professionals. Detailed architectural plans are often difficult for non design-building professionals to comprehend. Furthermore, non design-building professionals typically do not maintain or know how to use CAD software.

The increased complexity of the design and building process makes it more important than ever for planners and architects to access, manipulate and communicate the information contained in architectural floor plans. Like scientists and attorneys, successful architects and planners review precedents and build upon previous designs, rather than continuously innovating. Utilization of existing plans allows the designer to avoid mistakes and make incremental improvements. Given the limitations of a computer monitor, how does a professional planner or architect effectively review large quantities of architectural floor plans? Given the lack of any universal method of diagramming or displaying preliminary designs, how does the planning and design professional proceed during the facility planning and initial design phases?

While continuous innovation is impractical for most architects and planners, the ability to innovate in response to unique problems is highly valued in the design and construction industry. Given the complexity of today's building projects, and the vast quantity of precedents to review, how does the design professional leverage precedent in the design innovation process? How does he identify patterns between plans? Research demonstrates that the human brain is hard-wired to recognize patterns. Leslie Hart writes in "Human Brain and Human Learning," 1983 " . . . pattern-matching is inherently pleasing because that is what our minds are designed (or programmed) for . . . Quite apart from anything the teacher does . . . the student, being human, is a pattern-finder and pattern maker." In order to recognize patterns, what type of interface and method of interacting with design precedents and concepts will facilitate pattern recognition?

Research on innovation and creativity further indicates that the quality of innovation is positively correlated with large quantities of information. Michael Michalko writes in "Cracking Creativity, The Secrets of Creative Genius," 1998, that quantity fosters excellence: " . . . the most respected produced not only more great works, but also more "bad" ones. Out of their massive quantity of work came quality . . . Fluency of thought means generating quantities of ideas. Quantity breeds quality . . . the sensible thing to do is to produce many ideas before we evaluate." Given the massive number of building precedents in any given category of facilities, how does the planner and designer review and comprehend a sufficient quantity of plan concepts?

Michalko goes on to describe the value of abstraction in developing innovative concepts: "Abstraction is a basic principle in restructuring a problem . . . Einstein despaired of creating new knowledge from already existing knowledge . . . So he reversed this procedure and worked at a higher level of abstraction." What type of method and interface will allow the architect or planner to view previously developed designs at an abstract level, allowing for the creation of new, innovative solutions?

During the last five years, the Internet has become a key medium for displaying, accessing and sharing architectural information. What type of methods and interface will allow architects and planners to access large quantities of architectural plan information on the Internet? What type of methods and interface will allow architects and planners to display architectural plan information on the Internet for maximum comprehension by other professionals and users who do not have specialized architectural training? What type of methods and interface will allow architects and planners and to interact with architectural plan information on the Internet in a manner that allows for pattern recognition and design innovation?

SUMMARY OF THE INVENTION

In accordance with the present invention, the above and other problems are solved by providing a method, user interface, computer storage medium and propagated signal for representing an architectural plan diagram on a graphical user interface connected to an interactive communications network. The method includes the steps of displaying an architectural plan diagram on a graphical user interface, wherein the architectural plan diagram has multiple color-filled objects defined by voids, wherein the objects and voids represent features of an architectural plan; and displaying an architectural plan diagram key having a plurality of colored icons, each icon having associated feature information describing a functional feature, wherein the color of the colored icons corresponds to the color of the colored-filled objects such that each of the color-filled objects is associated with the feature information.

The user interface provides for a first viewing area displaying an architectural plan diagram, wherein the architectural plan diagram has multiple color-filled objects defined by voids, wherein the objects and voids represent features of an architectural plan; and a second viewing area displaying an architectural plan key having a plurality of colored icons, each icon having associated feature information describing a functional feature, wherein the color of the colored icons corresponds to the color of the colored-filled objects such that each of the color-filled objects is associated with the feature information.

A great utility of an embodiment of the invention is that it allows all members of the facility planning and design team to readily access and comprehend the key elements of architectural floor plans. Users can do this on a computer monitor without loss of clarity. Members of the planning and design team may view a large number of plans rapidly in a common format. Designers may use the same diagramming technique as a design tool, and the results may be easily compressed and rapidly downloaded on the Internet. Because users can view quantities of plan information at an abstract level, they can readily perceive patterns and develop new, innovate solutions.

An embodiment of the invention includes a method for creating and displaying architectural plan diagrams. The diagrams are distinct from architectural floor plans in that they contain far fewer elements, while still conveying the key elements of the floor plan organization. Rather than utilize lines and labels, the diagram methods relies on solid color-filled forms and a plan key that is common to all diagrams in a facility category. These diagrams are readily understood by people of various ages, professions and experience levels; no architectural or engineering training is required.

The plan diagrams are readily grasped on any size computer screen without loss of clarity. Whereas a typical room on a traditional floor plan, such as a classroom, will require eleven or more elements to be displayed, the same classroom may be displayed with a single element, a blue color-filled rectangle, in the plan diagram method shown in an embodiment of the invention. The same plan, which may have required thousand of elements to convey prior to the invention, may be represented with a few dozen elements.

An analogy may be made to file compression software: an image file of a red rose may include over one hundred thousand pixels and over a mega byte of electronic storage space. A compressed file stores a reference to thousands of red pixels without storing each individual pixel. It says in effect, "this a red pixel, the hundred and twenty pixels to the right are the same shade of red." Similarly, the plan diagram method says "here is a plan key with a blue icon representing classrooms. All of the blue forms in the diagram are classrooms, and they all have the same basic function."

An embodiment of the invention includes an interface comprised of more than one viewing area: one to display a series of plan diagrams and one for the plan key. In a preferred embodiment of the invention, a third viewing area includes facility data and a "mini navigation menu" allowing users to jump to more specific information regarding each plan. The multiple viewing areas or frames allow the user to scroll through a quantity of plan diagrams rapidly in one frame, while the plan key remains stationary in another plan; this allows the user to use both hand and eye to interact with the content, with minimal distraction from extraneous elements. In other words, the higher-level content or individual facility diagram is dynamically displayed, while the plan key is unchanging and displayed only once. The system allows for rapid review of a high quantity of plan information with superior comprehension. The placement of multiple diagrams in a scrollable window fosters pattern recognition, a key foundation of design innovation.

An embodiment of the invention includes a method for diagramming architectural plans that provide information at a greater level of abstraction than the floor plans, while remaining comprehensible to lay persons. Whereas a typical floor plan may have thirty or even a hundred distinct rooms and or features displayed, an embodiment of this invention simplifies the number of elements dramatically. This increased level of abstraction is an important element in problem solving and innovation.

The methods and interface of the various embodiments of this invention make optimal use of computer and Internet technology. The scrollable frame set is supported by all recent versions of both major Web browsers, including Netscape Navigator and Internet Explorer. Plan diagrams may be created using a variety of CAD programs, including, but not limited to AutoDesk's AutoCAD, and Diehl Graphsoft's VectorWorks. The plan diagrams are readily displayed with good clarity at 72 dots per inch, the standard resolution of computer monitors. A series of five or more plan diagrams are easily downloaded from the Internet at all standard modem speeds offered since 1995.

These and various other features as well as advantages, which characterize the present invention, will be apparent from a reading of the following detailed description and a review of the associated drawings.

BRIEF DESCRIPTION OF THE DRAWINGS

FIG. 3 is a chart illustrating key attributes of the color system employed in the color-filled forms that comprise both architectural plan diagrams and the plan key;

DETAILED DESCRIPTION OF THE INVENTION

The logical operations of the various embodiments of the present invention are implemented as a sequence of computer implemented steps running on a computing system. The implementation is a matter of choice dependent on the performance requirements of the computing system implementing the invention.

In a preferred embodiment of the invention, a method and user interface for representing architectural plan diagrams is provided for facilitating improved comprehension of architectural plan information by users of all experience levels on computers and the Internet.

Figure 1:
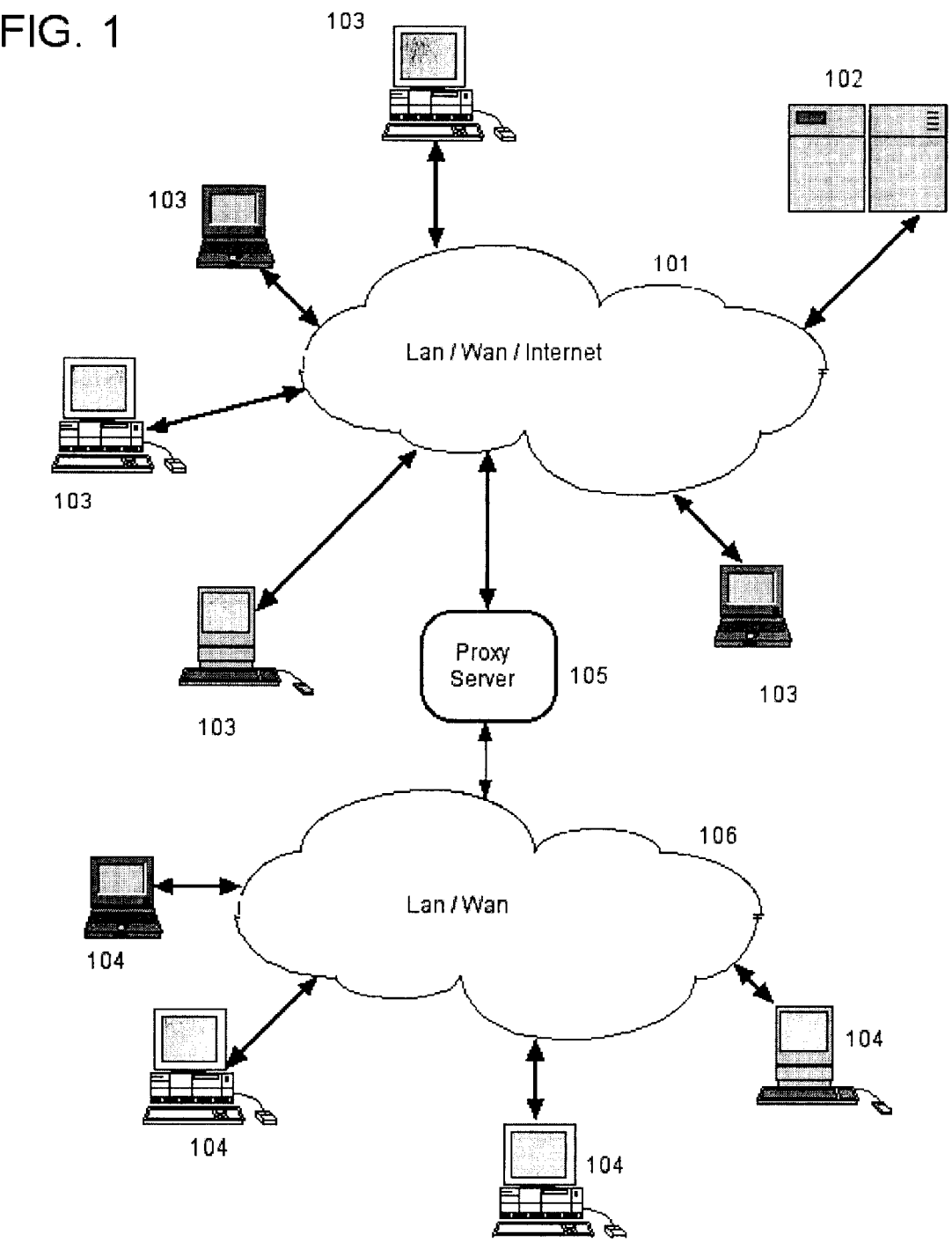
FIG. 1 illustrates one possible organization for a distributed computing system for implementing the present invention.

FIG. 1 illustrates one possible organization for a distributed computing system for implementing the present invention. The distributed computing system includes a plurality of computing systems connected together using a communications network. These computing systems include user workstations and laptop computers 103 directly connected to a wide area network (WAN) 101. Also connected to the WAN 101 is a plurality of server computers 102. In one possible embodiment of the present invention, the WAN 101 may be the Internet in which user computers 103 connected using a typical dial-up connection through an internet service provider (ISP).

Users of the network may also connect to the communications system using client computers 104 that are connected to a local area network (LAN) 106 in which the LAN 106 is connected to the internet 101 through a proxy server. In this arrangement, the client computers access resources located on the internet 101 by sending the request to the proxy server 105. The proxy server 105 in turn forwards the request to a destination on the internet. The response to this request is received by the proxy server 105 which forwards the request to the requesting client computer 104.

The server computers 102 receive these service requests from the user client computers 103, 104 and generate the appropriate responses. In the preferred embodiment, this communications is utilizing the standard http communications protocol. The responses generated and returned to the user client computers 103, 104 is typically in the form of a web page specified in HTML that may be displayed to the user utilizing a web browser such as MICROSOFT INTERNET EXPLORER or NETSCAPE NAVIGATOR.

FIG. 1 a illustrates computers 102, 103, 104 or 105 according to one embodiment of the present invention. An exemplary computing system for embodiments of the invention includes a general purpose computing device in the form of a conventional computer system 102, 103, 104, or 105 including a processor unit 112, a system memory 114, and a system bus 116 that couples various system components including the system memory 114 to the processor unit 102, 103, 104, or 105. The system bus 116 may be any of several types of bus structures including a memory bus or memory controller, a peripheral bus and a local bus using any of a variety of bus architectures. The system memory includes read only memory (ROM) 118 and random access memory (RAM) 120. A basic input/output system 122 (BIOS), which contains basic routines that help transfer information between elements within the computer system 102, 103, 104, or 105, is stored in ROM 118.

The computer system 102, 103, 104, or 105, further includes a hard disk drive 123 for reading from and writing to a hard disk, a magnetic disk drive 124 for reading from or writing to a removable magnetic disk 126, and an optical disk drive 128 for reading from or writing to a removable optical disk 129 such as a CD ROM, DVD, or other optical media. The hard disk drive 123, magnetic disk drive 124, and optical disk drive 128 are connected to the system bus 116 by a hard disk drive interface 130, a magnetic disk drive interface 132, and an optical drive interface 134, respectively. The drives and their associated computer-readable media provide nonvolatile storage of computer readable instructions, data structures, programs, and other data for the computer system 102, 103, 104, or 15.

Although the exemplary environment described herein employs a hard disk, a removable magnetic disk 126, and a removable optical disk 129, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 126, optical disk 129, ROM 118 or RAM 120, including an operating system 136, one or more application programs 138, other program modules 140, and program data. 142. A user may enter commands and information into the computer system 102, 103, 104, or 105, through input devices such as a keyboard 144 and mouse 146 or other pointing device. Examples of other input devices may include a microphone, joystick, game pad, satellite dish, and scanner. These and other input devices are often connected to the processing unit 112 through a serial port interface 150 that is coupled to the system bus 116. Nevertheless, these input devices also may be connected by other interfaces, such as a parallel port, game port, or a universal serial bus (USB). A monitor 152 or other type of display device is also connected to the system bus 116 via an interface, such as a video adapter 154. In addition to the monitor 152, computer systems typically include other peripheral output devices (not shown), such as speakers and printers.

The computer system 102, 103, 104, or 105, may operate in a networked environment using logical connections to one or more remote computers, such as a remote computer 156. The remote computer 156 may be a computer system, a server, a router, a network PC, a peer device or other common network node, and typically includes many or all of the elements described above relative to the computer system 102, 103, 104, or 105. The network connections include a local area network (LAN) 158 and a wide area network (WAN) 160. Such networking environments are commonplace in offices, enterprise-wide computer networks, intranets, and the Internet.

When used in a LAN networking environment, the computer system 102, 103, 104, or 105, is connected to the local network 158 through a network interface or adapter 162. When used in a WAN networking environment, the computer system 102, 103, 104, or 105, typically includes a modem 164 or other means for establishing communications over the wide area network 160, such as the Internet. The modem 164, which may be internal or external, is connected to the system bus 116 via the serial port interface 150. In a networked environment, program modules depicted relative to the computer system 102, 103, 104, or 105, or portions thereof, may be stored in the remote memory storage device. It will be appreciated that the network connections shown are exemplary, and other means of establishing a communications link between the computers may be used.

Figure 1A:
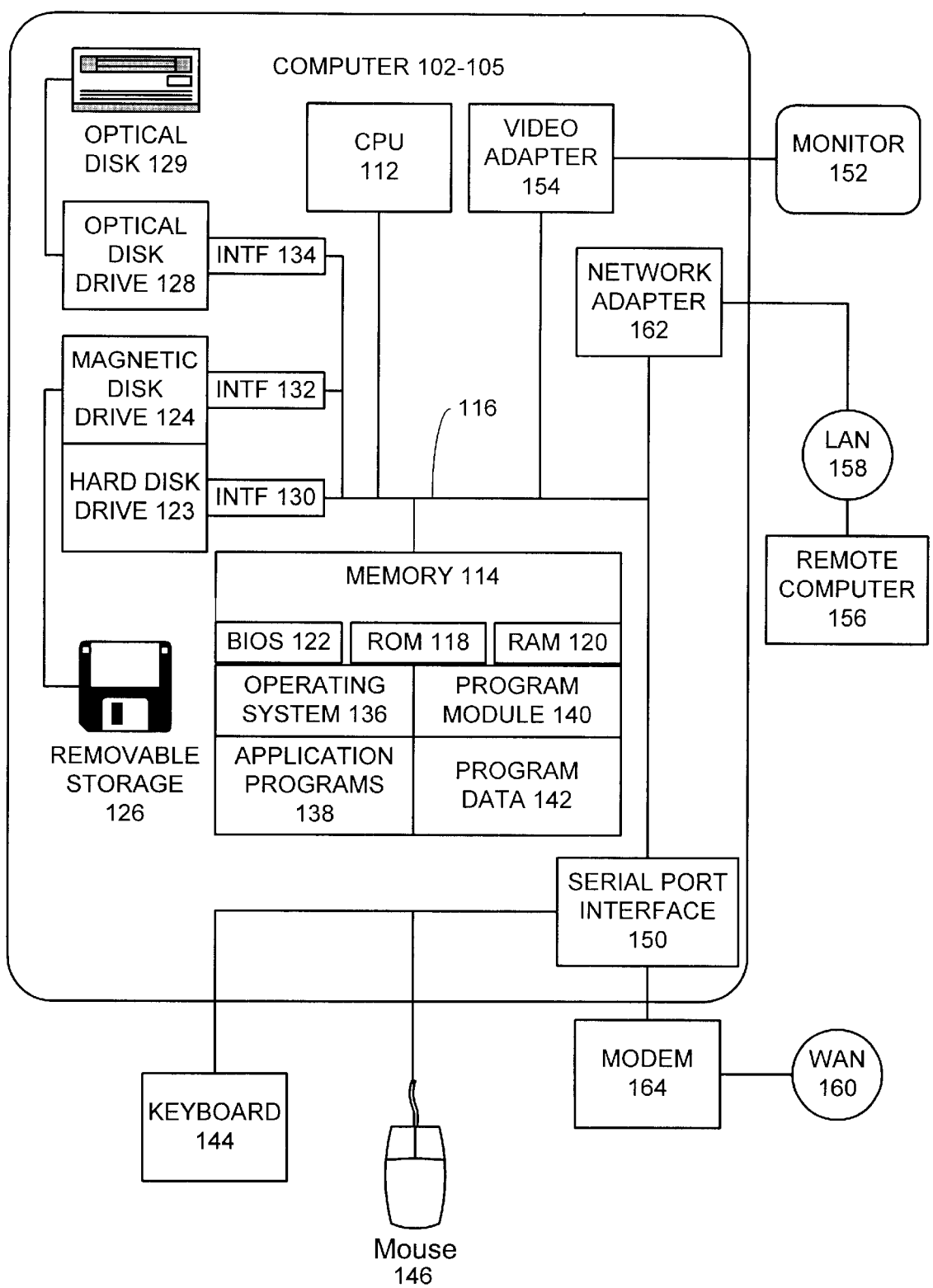
FIG. 1a illustrates computers according to one embodiment of the present invention.

The embodiments of the invention described herein are implemented as logical operations in a system having connections to a distributed network such as the Internet as described in FIGS. 1 and 1a. The logical operations are implemented (1) as a sequence of computer implemented steps running on a computer system and (2) as interconnected machine modules running within the computing system. This implementation is a matter of choice dependent on the performance requirements of the computing system implementing the invention. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

Figure 2:
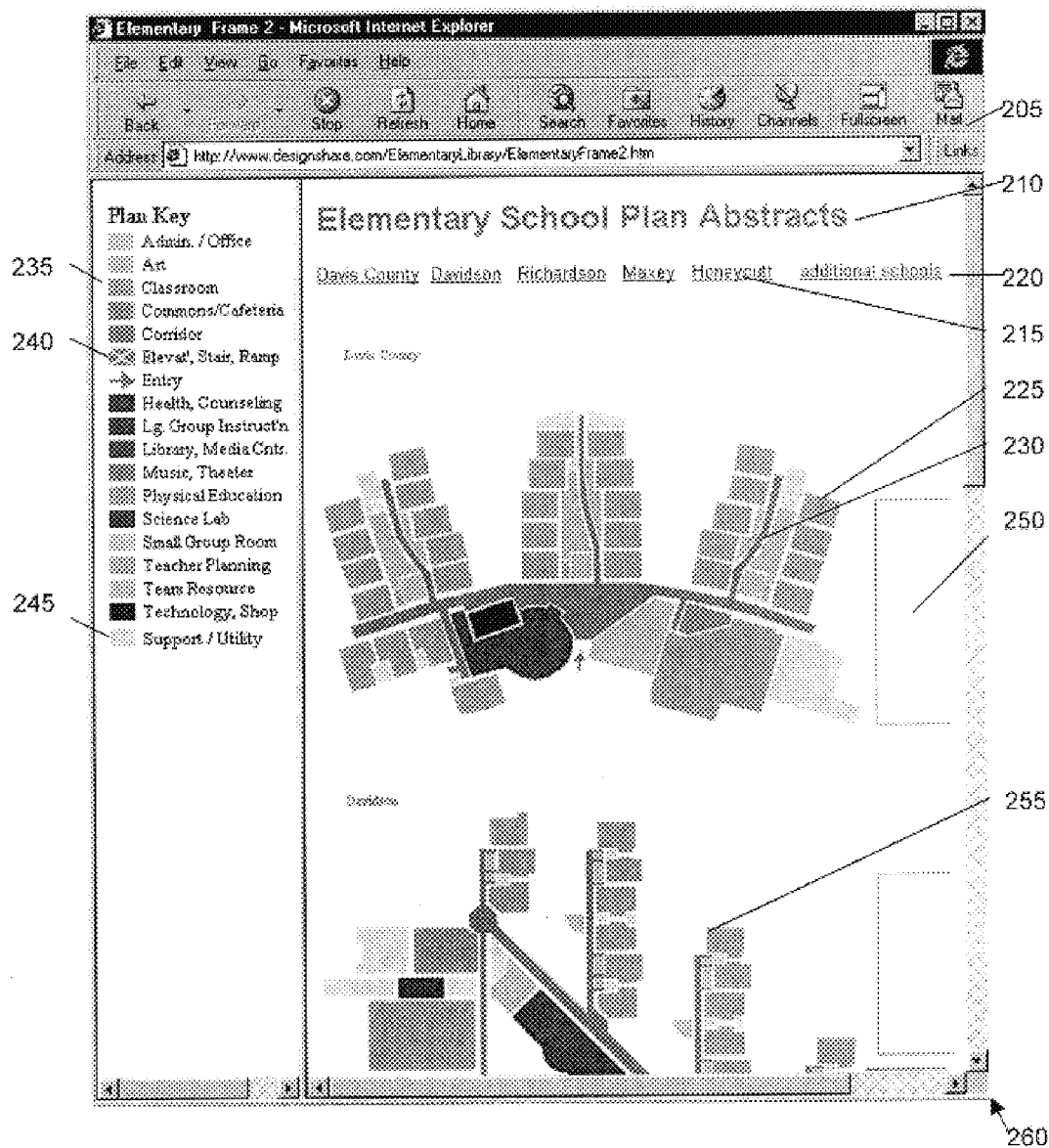
FIG. 2 is an illustration of the user interface, including a key plan and architectural plan diagram, displayed on a popular Web browser.

Referring first to FIG. 2, shown is an example of an embodiment of the invention, as applied to elementary school designs, viewed on an Internet browser 205. A title describing the facility type or category is displayed at the top of the browser frame 210. In a preferred embodiment of the invention, a series of names representing individual facilities (in this case elementary schools) are located directly beneath the facility category title; these titles are hyperlink "bookmarks," and allow users to jump directly to an individual plan diagram, as an alternative to scrolling 215. Adjacent to the bookmarks, a button allowing the user to jump from the current frame and displayed diagrams, to another frame, with an additional series of projects 220.

In this example, five architectural plan diagrams are displayed directly beneath the facility category title individual facility names. The user may click and or drag the up or down arrows on any standard Web browser to rapidly view all of the diagrams 260. Five diagrams is an ideal quantity in this example, because it provides a sufficient to allow the user to perceive patterns, without overwhelming the user with too much information. Furthermore, with the present state of Internet access technology, five diagrams may be downloaded and displayed rapidly, even on slower, older modems 225, 255.

The architectural plan diagrams are comprised of multiple color-filled forms, surrounded by voids 225, 255. The forms and voids represent architectural features. In this example, the forms represent functional areas or rooms, and the voids represent structural elements, most typically walls. In a preferred embodiment of this invention, no more than twenty different colors will be utilized in the plan diagrams; the greater the number of colors used, the more complex and thus greater difficulty involved in comprehending the organization of the plan, and patterns between plans 225.

In one embodiment, each color-filled form is proportionately between 10% and 20% smaller than corresponding features of the architectural plan, while the distance between areas remains the same; the result is that voids will become visible between areas and forms. Other size ratios may be used. The voids create boundaries between forms, allowing the user to distinguish where one area begins and another ends. In contrast to a solid or double line, traditionally used to define boundaries, the void involves far less information to display and comprehend 225.

In a preferred embodiment of the invention, circulation space (corridors, hallways, ramps, elevators, walkways) will be represented in a high contrast, consistent color for all architectural plans, even among differing facility categories. In the present example, circulation paths are represented by the color red, sometimes referred to as "Fire-Engine Red," "True Red and "Vermilion Red." Users grasp the color representation quickly and intuitively, red being the color of the blood stream and circulation paths throughout the human body. The color red will work as well representing circulation paths in educational facilities, health care facilities, corporate facilities, cultural/religious facilities or residential facilities 230.

An architectural plan diagram key 235 is displayed adjacent to the plan diagrams. The key contains a number of colored icons. Each icon has associated feature information describing a feature of an architectural floor plan. The color of the icons in the plan diagram key corresponds to the color-filled forms such that each of the color-filled forms is associated with the feature information 235.

In a preferred embodiment of the invention, the plan diagram key 235 is located in a separate Internet browser frame from the plan diagrams. While the user scrolls through the plan diagrams 225, engaging in an interactive action involving both hand and eye, the plan key 235 in the adjacent frame remains stationary. The fact that the diagrams change while the user scrolls, but the plan key remains the same emphasizes that the key is common to all of the diagrams in this facility category and browser frame. The common key facilitates pattern recognition between diagrams. Pattern recognition is a foundation of design innovation. Design innovation is highly valued in the architectural and facility planning industries, not only because of the unique value to an organization or community for a "building signature," but because geographical, economic and other local physical characteristics make each building project unique. The ability to recognize patterns in design and thus innovate specific solutions in a manner more efficient than previous methods is a unique advantage of the invention.

In a preferred embodiment of the invention, vertical circulation elements, such as elevators, stairs and ramps, will have two intersecting diagonal voids across the form. In the present example, the forms take the appearance of two diagonal intersecting white lines, connecting opposite corners of a rectangular colored icon. The use of two diagonal lines is a common convention in architectural floor plans to denote an elevator or vertical opening; however, the use of intersecting diagonal lines as defined by voids for all vertical circulation elements in a method and user interface representing architectural plan diagrams on an Internet browser or computer monitor is unique 240.

In this example, support and utility spaces, such as mechanical, storage and toilet rooms, are represented by a single colored-filled icon labeled "Support/Utility." For most facility types, a number of support functions may be grouped. A floor plan for a complex facility type may have a hundred or more different types of features. As mentioned above, in a preferred embodiment of the invention, no more than twenty plan diagram colors and feature categories will be utilized, to minimize complexity and maximize comprehension and pattern recognition 245.

The graphical user interface may include a third area displaying identification information that describes the architectural plan 250. In the present example, displayed information includes the name of the school, architect, student capacity, facility size in square feet, date completed and construction cost. This third area also includes hyperlinks to detailed floor plans, a site plan, facility program narrative, photographs, owner, architect, engineer and contractor contact information. Because this display area contains numerous hyperlinks to other screens, it may be referred to as "mini navigation menu." 905. In some cases, a link to an interior detail or building section is also included. A link to a more than one floor plan may be included; these may be dynamic displays, allowing the user to "zoom" in using a downloadable software viewer. Each plan diagram has a unique mini navigation menu 905 adjacent to it. Major features of the mini navigation menu may be consistent among plan diagrams in a common facility type, thus allowing the viewer to quickly grasp the scope and available path to supporting information 250.

FIG. 3 is a chart illustrating key attributes of the color systems employed in the color-filled forms utilized in the architectural plan diagrams 225 and in the plan key 235. As the title of the chart indicates in this example, attributes for several different systems of describing colors are provided 305. This may be important where the invention is utilized to represent architectural designs from a variety of sources, and individuals and firm contributors utilize different types of software to create and format plans and diagrams. In the present example, the third column from the left 310 contains the numerical color designation from a popular CAD software program corresponding to the color-filled icon adjacent 325. The fourth column from the left includes the equivalent red, green and blue ("RGB") value, referring to the standard color designation for colors displayed on computer monitors 315. The fifth column from the left includes the hexadecimal number equivalents; this is the standard Internet-based hypertext mark up language ("HTML") format for specifying colors 320.

The first column in FIG. 3 includes color-filled icons representing features in architectural floor plans and corresponding to color-filled forms in the architectural plan diagrams. The icons may be rectilinear, as shown in the example, circular on polygons. Colors should be selected to maximize contrast between colors. As noted above, it is preferable that the number of colors is limited, ideally to twenty or less. A limited color palette will not only improve user comprehension, it will also enable users with varying levels of visual acuity to distinguish between colors. Furthermore, a limited color palette allows users with printers of varied capabilities to create a printed version of the interface and diagrams with sufficient clarity to distinguish between all colors 325.

The second column in FIG. 3 (330) includes the area or feature name corresponding to the color-filled icon in column 1 325. Many of the names used in this example may be the same for a variety of facility types. Areas or features with a universal or nearly universal applicability include "Administrative," "Corridor, Elevator, Stair, Ramp" "Entry," and "Support/Utility." Other area/feature designations will be specific to the particular facility category, such as "Classroom," for educational facilities, or "Operating Room," for medical facilities.

Figure 4:
FIG. 4 is a chart that displays architectural floor plan room names and equivalent plan diagram names and icons.

FIG. 4 is a chart that displays architectural floor plan room names 405, abbreviations 410 and the equivalent plan diagram color key icon 415 and area/feature name 420. In this example, more than 30 floor plan designations and corresponding abbreviations are utilized in the detailed architectural floor plans. In contrast, only sixteen different colors are utilized in the plan diagram color key 235, thus the basic organization of each plan is represented with less than half the designations used in a detailed floor plan. It may be important to create and make available such a chart where architectural floor plans and or diagrams are contributed from numerous sources, allowing each contributor to quickly relate a common abbreviation or floor plan designation to the equivalent plan diagram color and designation.

Figure 5:
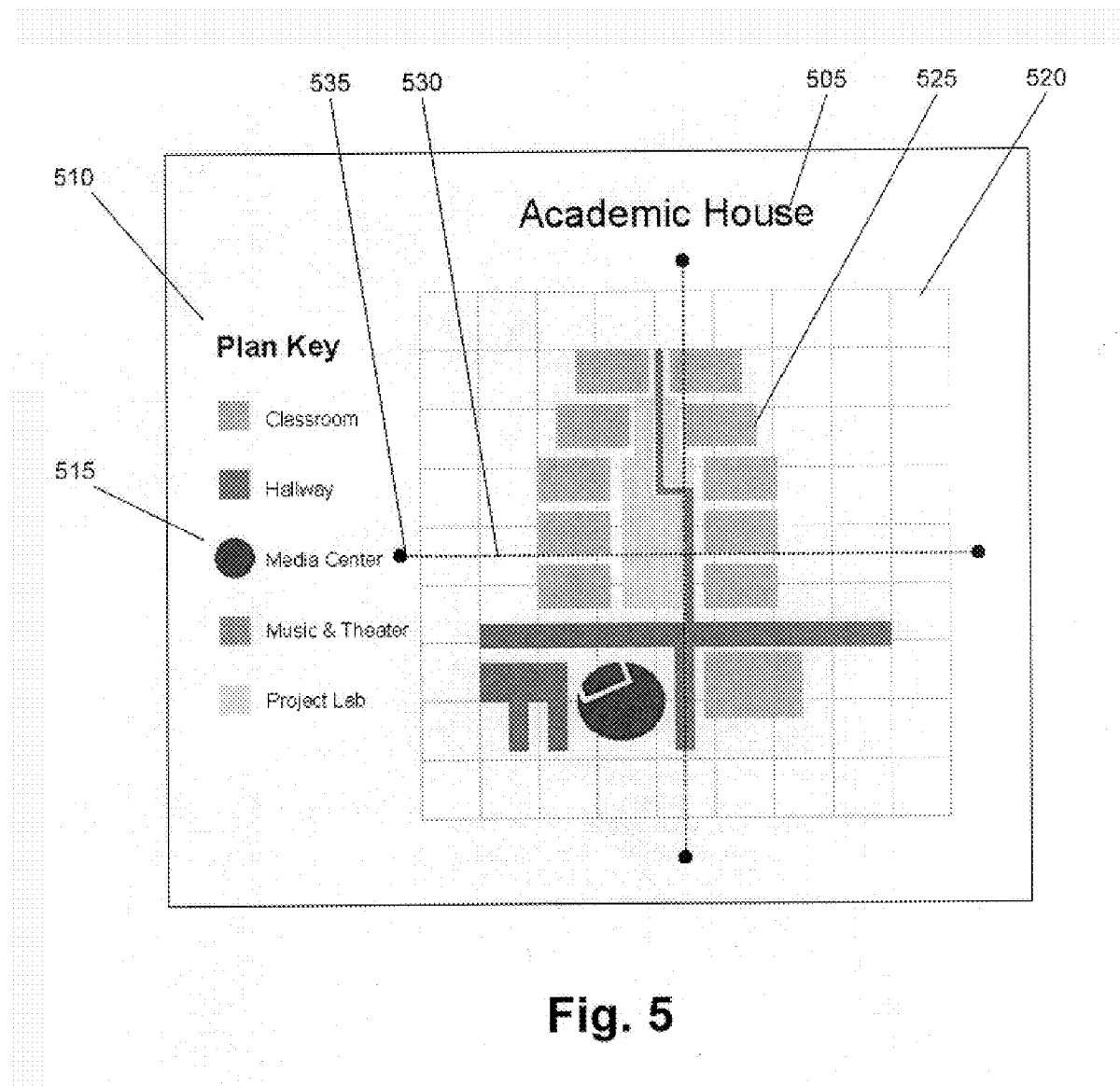
FIG. 5 illustrates the use of the architectural plan diagrams as a design method.

FIG. 5 illustrates the use of the architectural plan diagrams 225, 525 as a design method. This design method may be distinguished from a method for representing existing architectural floor plans; it is an efficient method for proceeding with preliminary planning and schematic architectural design prior to the existence of an architectural floor plan. The method may be employed on a variety of known drawing programs. Templates may be created containing a grid 520, plan key 510 and color-filled icons that are suitable for a particular facility category or sub-category. Tools for enlarging, reducing and modifying the shape of the color-filled forms will vary, depending on the drawing application selected.

In this example, a title designates a specific facility category or sub-category of a building type, "Academic House," referring to a cluster of classrooms and support spaces within a school 505. An adjacent plan key 510 includes color-filled icons and names referring to functional areas and or features that are specific to the facility type; icons may be "active," such that the designer may simply click on the icon and a duplicate icon of the same color appears in the adjacent drawing area 520. A variety of shapes may be used for the color-filled icons, including rectangles, polygons and circles 515.

A grid representing a scale of measure suitable for the specific facility type or sub-category is displayed, such as 4 feet, 5 feet, 10 feet, 20 feet or 30 feet 520. An architectural plan diagram 225, 525 may be created, having the same characteristics of shape and voids described above. Horizontal and vertical axis may be included, providing a reference point for the designer 530. Identifying coordinates or "Handles" 535 may be included at the ends of the axis lines; designers may assign names and coordinates to these handles, facilitating easy identification later, particularly if sub-component plan diagrams are assembled into larger facility plan diagram assemblies 225.

Figure 6:
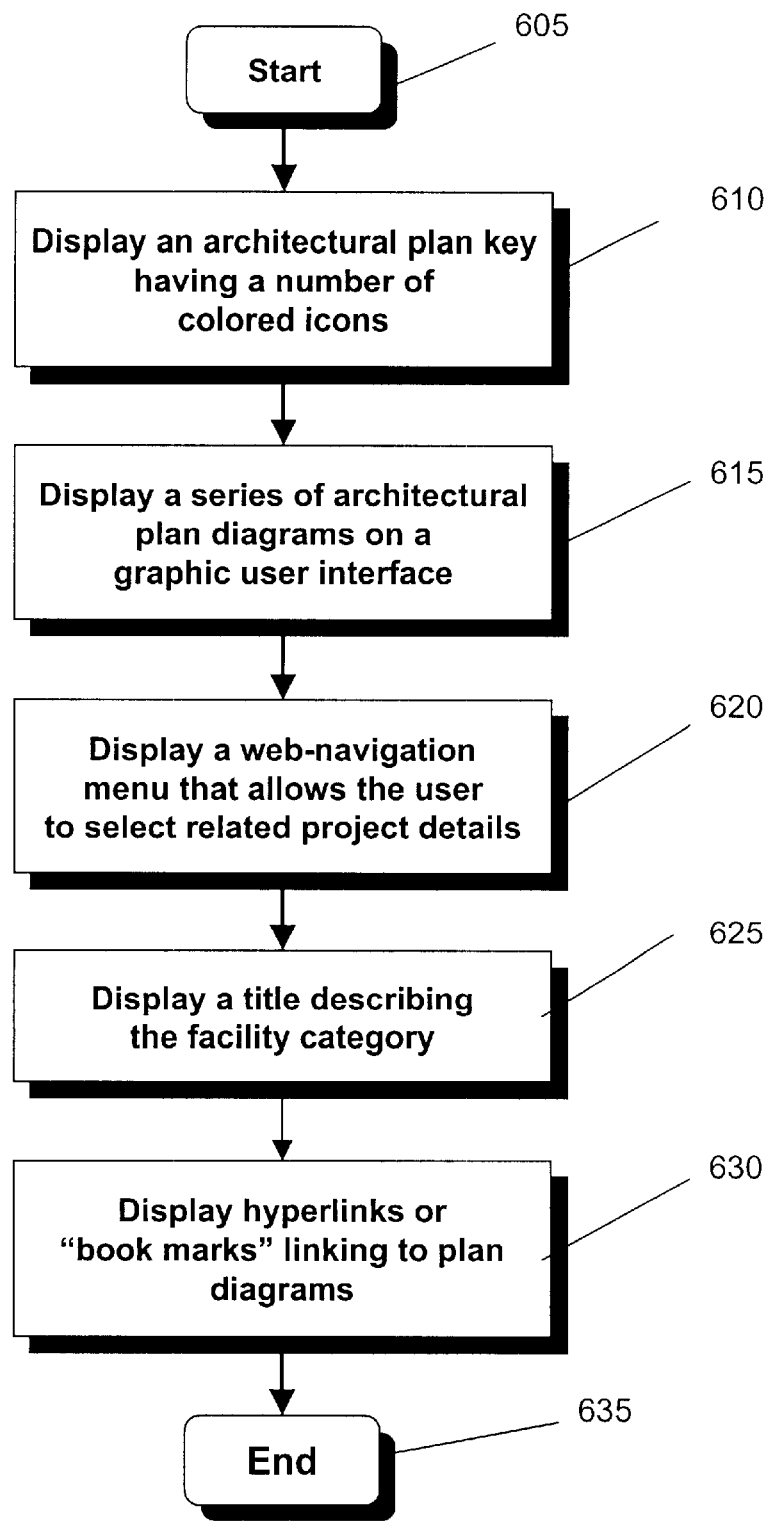
FIG. 6 is a flow chart illustrating the steps in creating a preferred embodiment of the user interface.

FIG. 6 is a flow chart illustrating the steps in creating a preferred embodiment of a user interface representing architectural plan diagrams, illustrated in FIG. 2. The steps may be performed under computer control, operator control, or both. Start by opening an HTML editor, such as Microsoft's Front Page 605. Create a frame page FIG. 2 with two or more frames; the method for doing this will be readily apparent to those skilled in the art of HTML editing. Insert a plan key 235, 510 in one of the frames. The key may be a single image, previously formatted by a CAD or other drawing program, or it may be comprised of an HTML table, with color-filled icons in one-column and area or feature designations in an adjacent column 235, 610.

Insert a series plan diagrams 225, 615 in a frame adjacent to the frame containing the plan key 235. Place a third viewing area adjacent to each plan diagram that contains identification information that describes that describes the architectural plan 250, 620, 905. In the example shown in FIG. 9, displayed information includes the name of the school, architect, student capacity, facility size in square feet, date completed and construction cost. This third area also includes hyperlinks to detailed floor plans, a site plan, facility program narrative, photographs, owner, architect, engineer and contractor contact information. Because this display area contains numerous hyperlinks to other screens, it may be referred to a "mini navigation menu." 250, 905. In some cases, a link to an interior detail or building section is also included. A link to a more than one floor plan may be included; these may be dynamic displays, allowing the user to "zoom" in and our using a downloadable software viewer, such as AutoDesk's "WHIP."

Each plan diagram may have a unique mini navigation menu adjacent 905 to it. When the user scrolls through the plan diagrams, the mini navigation menu moves with each diagram. One way to accomplish this is to place the plan diagram and mini navigation menu in an HTML table that is inserted inside the diagram display. One cell of the table includes the diagram image (typically a GIF or JPG file). An adjacent cell is linked to a mini navigation table using an "include page" function, as known to those skilled in the art of HTML editing. The advantage of using an "include page" or similar function is that the mini navigation menu 905 is on a separate HTML page, and may be shared with various other pages that the diagram interface page FIG. 2 links to. For example, the mini navigation menu may include links to detailed floor plans and photographs FIG. 9. The floor plan and photograph pages FIG. 9 may display the same mini navigation menu, also using an include page function. In the example illustrated by FIG. 2, four different HTML pages display the same mini navigation menu 905, while the mini navigation menu was created and stored only once. Furthermore, any update or modification to the mini navigation menu will automatically update on all four pages that display it. It is preferable that the major features of the mini navigation menu are consistent among plan diagrams in a common facility type, thus allowing the viewer to quickly grasp the scope and available path to supporting information.

In a preferred embodiment of the invention, display a title describing the facility type or category at the top of the browser frame 210, 625. Display a series of names representing individual facilities (in this case elementary schools) located directly beneath the facility category title; these titles are hyperlink "bookmarks," and allow users to jump directly to an individual plan diagram, as an alternative to scrolling 215, 630.

Adjacent to the bookmarks, display a button allowing the user to jump from the current frame and displayed diagrams, to another frame, with an additional series of projects 220, 635.

Figure 7:
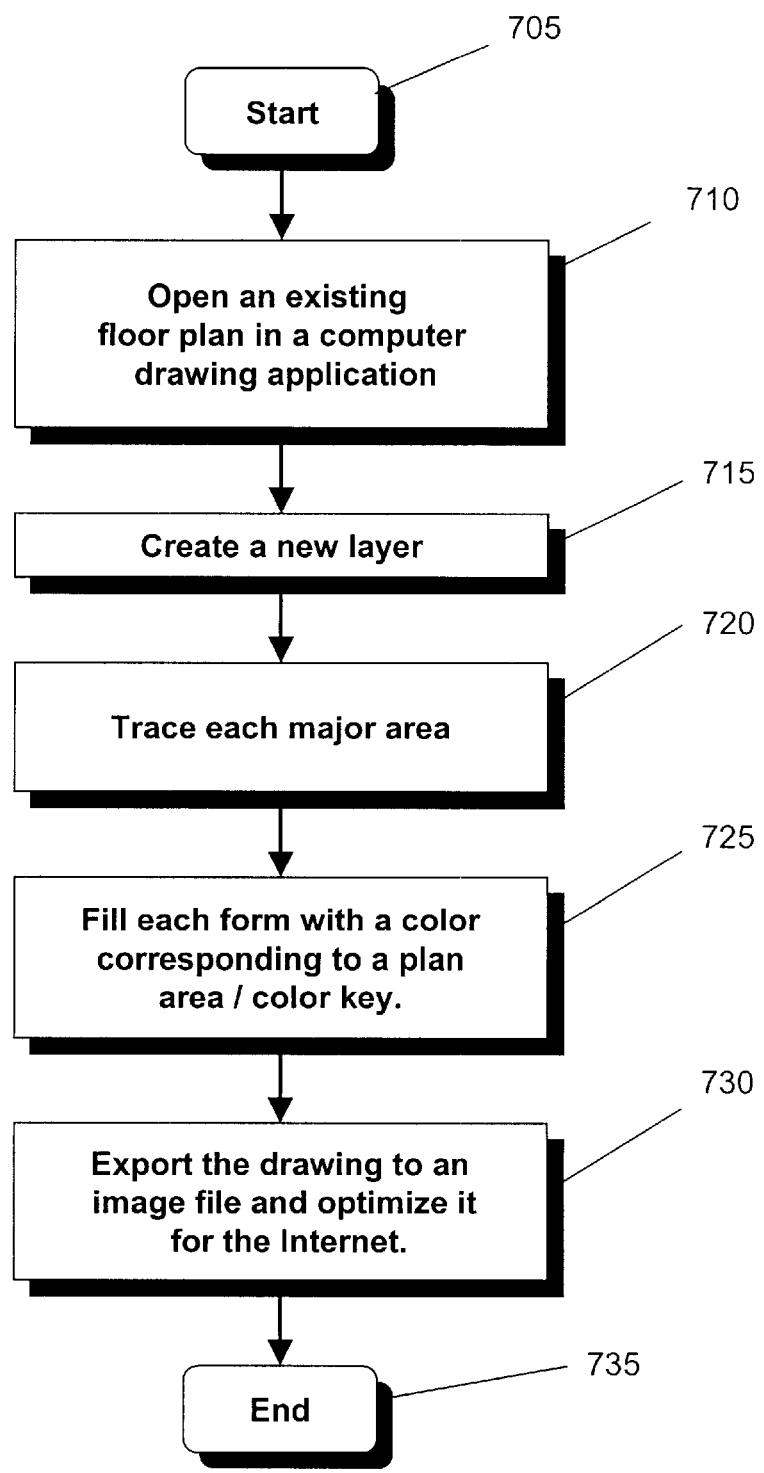
FIG. 7 is a flow chart illustrating the steps in creating a plan diagram that is representative of an existing architectural floor plan.

FIG. 7 is a flow chart illustrating exemplary steps in creating a plan diagram that is representative of an existing architectural floor plan. The steps may be performed under computer control, operator control, or both. Start by selecting a floor plan for diagramming. For a multi-floor facility, begin with a floor that is most typical, or represents the primary use of the facility 705. Open the existing floor plan in a CAD application 710. Create a new layer for the diagram, keeping the floor plan layer visible beneath 715. Trace each major area with a rectangle, polygon, circle or combination thereof 720. Trace outlines to the inside of underlying areas such that each traced form is proportionately 10% to 20% smaller than the corresponding features of the architectural plan in the layer beneath. Fill each form with a color corresponding to the plan key 235, 510. Utilize a consistent color system with clearly established equivalents to various popular color designation systems FIG. 3. Export the drawing to an image file such as a GIF or JPG and optimize it for the Internet using software such as Adobe's Image Ready 730. In a preferred embodiment of the invention, export a smaller, "icon-sized" image for use in the mini-navigation menu 250, 905. 735.

Figure 8:
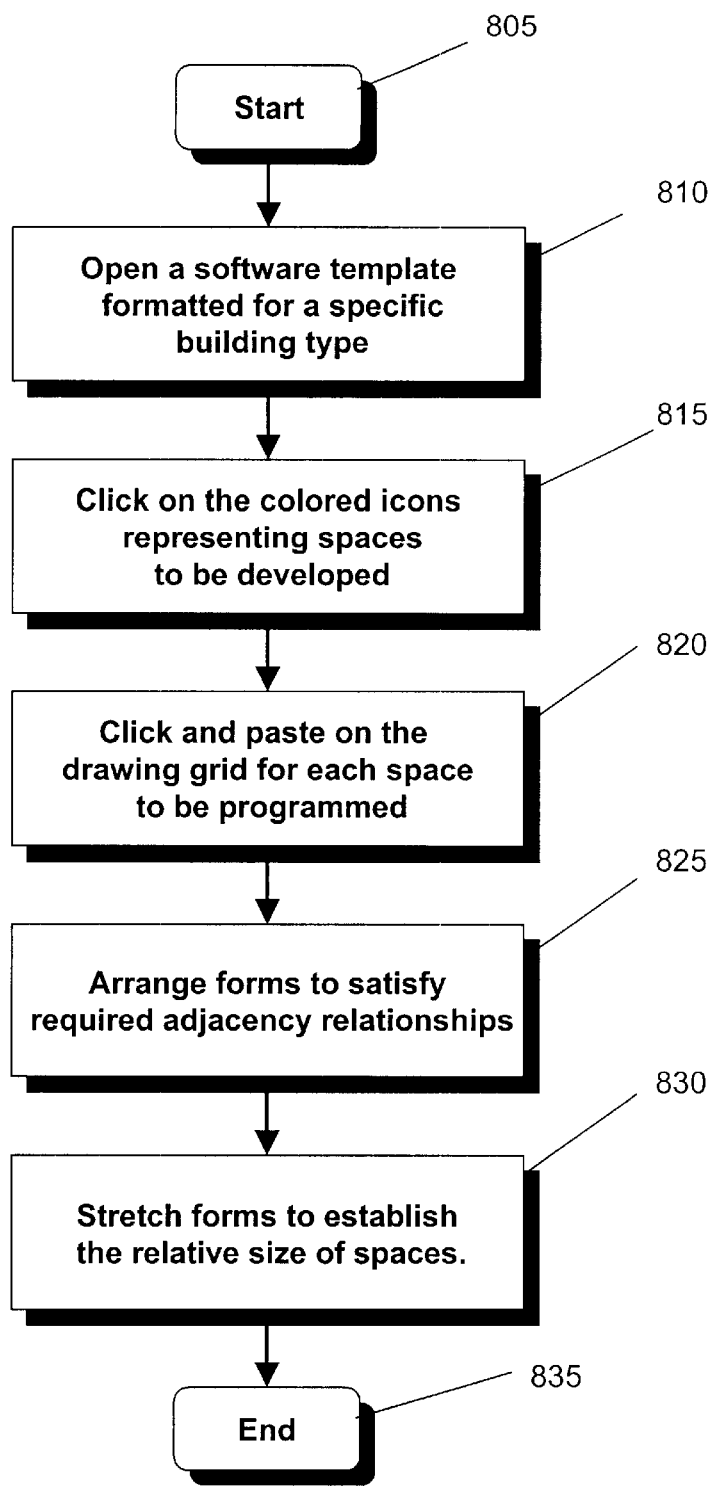
FIG. 8 is a flow chart illustrating how the invention may be used as a design method, where an architectural floor plan has not yet been developed.

FIG. 8 is a flow chart illustrating how the invention may be used as a design method, where an architectural floor plan has not been developed yet. The steps may be performed under computer control, operator control, or both. Start by creating a template for a specific building type or component of a building type 805. Any standard CAD program may be used; it may also be created on a more basic presentation program, such as Microsoft PowerPoint. There are advantages to offering the template in both a full-featured CAD program and a more universally used presentation program. Accurate scaling (available with CAD programs) is not critical during design planning or the early stage of design. Non-design professionals may have reason to participate in this diagramming process, establishing the type and number of areas, as well as adjacencies without needing to deal with structural issues. Presentation programs such as PowerPoint are much more universally used than CAD programs. Those skilled in the art of CAD or presentation application programming may create a template that includes all of the elements found in FIG. 5.

Open a software template formatted for a specific building type 810. Click on the colored icons representing the rooms or areas to be developed 815. Click and paste on the drawing grid for each space or area to be included in the diagram 820. Arrange forms to satisfy required adjacency relationships 825. Stretch forms to establish the relative size of spaces 830. Those skilled in the art of CAD or presentation software may use a variety of techniques for stretching, arranging and combining the color-filled forms. Save or export files to a format suitable for the final display purpose. In a preferred embodiment of this invention, images will be saved as GIF or JPG images, and placed in a scrollable frame set within a Web browser such as Microsoft Internet Explorer or Netscape Navigator 835.

Figure 9:
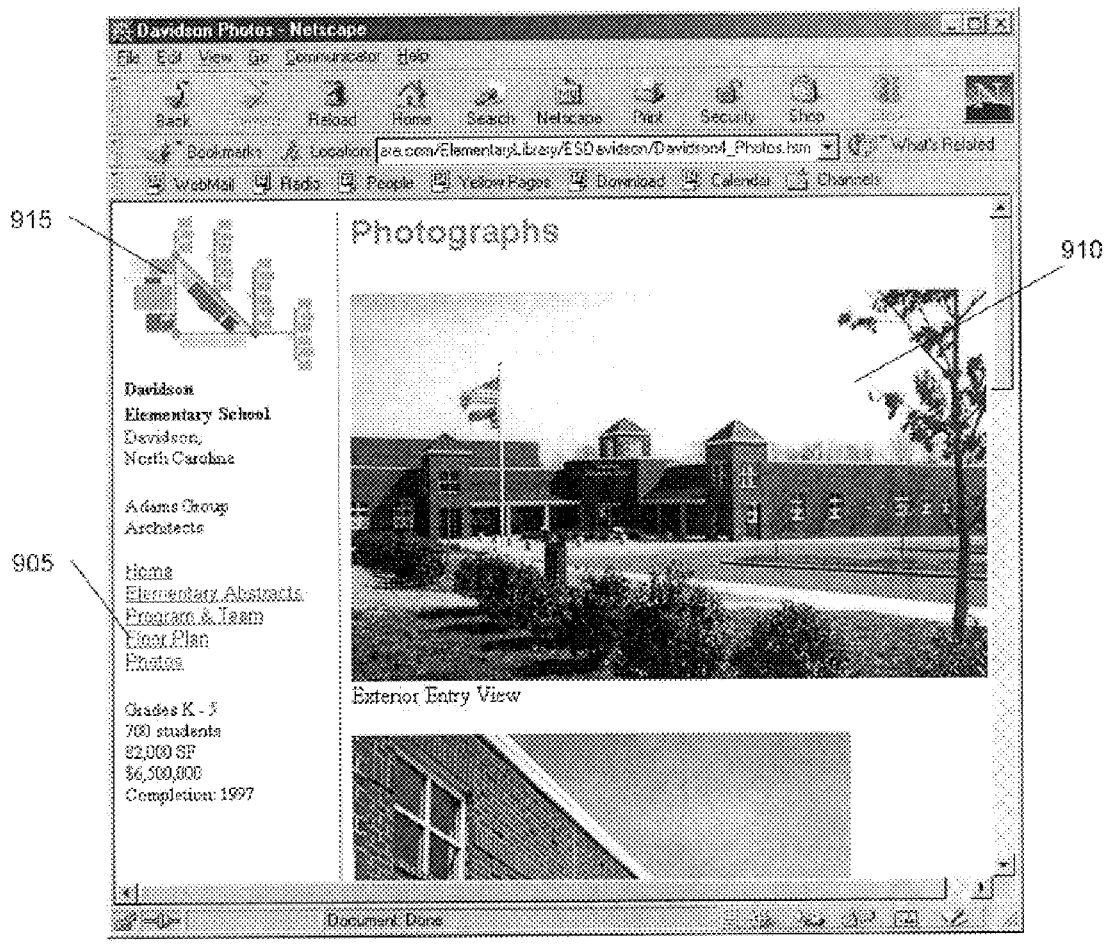
FIG. 9 illustrates the use of a smaller, "icon-sized" version of a plan diagram.

FIG. 9 illustrates the use of a smaller, "icon sized" version of a color-filled plan diagram 915. In a preferred embodiment of the invention, "mini navigation menus" 250, 905 may link to numerous features of the facility being described, including, but not limited to: detailed floor plans, a program narrative, site plan and photographs. FIG. 9 illustrates a page of facility photographs that may be linked from the interface containing plan diagrams FIG. 2. In this example, the photographs 910 are contained in one column of an HTML table, and a mini navigation menu is located in an adjacent column 250, 905. Immediately above the mini navigation menu 250, 905, an icon-sized version of the color-filled plan diagram is displayed 915. The advantage of displaying an icon-sized version of the plan diagram is to provide the user with a consistent identifying element for every page that describes a particular facility. If the user is researching many facilities, this identifying element will help him distinguish between facilities. Furthermore, the icon-sized diagram 915 serves as a small key plan while the user is looking at other feature pages, such as photographs or a narrative program, aiding in comprehension of the overall facility organization.

Thus the present invention is presently embodied as a method, user interface, computer storage medium or propagated signal containing a computer program for representing an architectural plan diagram on a graphical user interface connected to an interactive communications network.

While the invention has been particularly shown and described with reference to preferred embodiments thereof, it will be understood by those skilled in the art that various other changes in the form and details may be made therein without departing form the spirit and scope of the invention.

What is claimed is:

1. A method for representing an architectural plan diagram on a graphical user interface connected to an interactive communications network, comprising the steps of:

displaying an architectural plan diagram on a graphical user interface, wherein the architectural plan diagram has multiple color-filled objects defined by voids, wherein the objects and voids represent features of an architectural plan; and displaying an architectural plan diagram key having a plurality of colored icons, each icon having associated feature information describing a functional feature, wherein the color of the colored icons corresponds to the color of the colored-filled objects such that each of the color-filled objects is associated with the feature information.

2. The method of claim 1, wherein the voids represent structural elements.

3. The method of claim 1, wherein the architectural plan is selected from a group comprising a site plan, floor plan, and interior plan.

4. The method of claim 1, wherein the architectural plan diagram color-filled objects are proportionately between 10% and 20% smaller than corresponding features of the architectural plan whereby voids define the objects.

5. A graphical user interface connected to an interactive communications network for analyzing and comparing a plurality of architectural plans, comprising:

a first viewing area displaying an architectural plan diagram, wherein the architectural plan diagram has multiple color-filled objects defined by voids, wherein the objects and voids represent features of an architectural plan; and a second viewing area displaying an architectural plan key having a plurality of colored icons, each icon having associated feature information describing a functional feature, wherein the color of the colored icons corresponds to the color of the colored-filled objects such that each of the color-filled objects is associated with the feature information.

6. The graphical user interface of claim 5, further comprising:

a third viewing area displaying identification information that describes the architectural plan.

7. The graphical user interface of claim 5, wherein the first and second areas comprise frames, wherein the first area comprises a frame for scrollably displaying more than one architectural plan diagram such that the second viewing area is fixed while the first area is scrollably displayed, whereby commonalties between multiple architectural plans can be perceived through the graphical user interface.

8. A computer storage medium readable by a computing system and encoding a computer program of instructions for executing a computer process for representing architectural plan diagrams on a graphical user interface, said computer process comprising the steps of:

displaying an architectural plan diagram on a graphical user interface, wherein the architectural plan diagram has multiple color-filled objects defined by voids, wherein the objects and voids represent features of an architectural plan; and displaying an architectural plan model key having a plurality of colored icons, each icon having associated feature information describing a functional feature, wherein the color of the colored icons corresponds to the color of the colored-filled objects such that each of the color-filled objects is associated with the feature information.

9. The method of claim 8, wherein the voids represent structural elements.

10. The method of claim 8, wherein the architectural plan is selected from a group comprising a site plan, floor plan, and interior plan.

11. The method of claim 8, wherein the architectural plan diagram color-filled objects are proportionately between 10% and 20% smaller than corresponding features of the architectural plan whereby voids define the objects.

12. A propagated signal on a carrier detectable by a computing system and encoding a computer program of instructions for executing a computer process for representing architectural plan diagrams on a graphical user interface said computer process comprising the steps of:

displaying an architectural plan model on a graphical user interface, wherein the architectural plan model has multiple color-filled objects defined by voids, wherein the objects and voids represent features of an architectural plan; and displaying an architectural plan model key having a plurality of colored icons, each icon having associated feature information describing a functional feature, wherein the color of the colored icons corresponds to the color of the colored-filled objects such that each of the color-filled objects is associated with the feature information.

13. The method of claim 12, wherein the voids represent structural elements.

14. The method of claim 12, wherein the architectural plan is selected from a group comprising a site plan, floor plan, and interior plan.

15. The method of claim 12, wherein the architectural plan diagram color-filled objects are proportionately between 10% and 20% smaller than corresponding features of the architectural plan whereby voids define the objects.

* * * * *